United States Patent [19]

Yost

[11] 4,316,214

[45] Feb. 16, 1982

[54] KEYING SIGNAL GENERATOR WITH INPUT CONTROL FOR FALSE OUTPUT IMMUNITY

[75] Inventor: Thomas D. Yost, Indianapolis, Ind.

[73] Assignee: RCA Corporation, New York, N.Y.

[21] Appl. No.: 182,752

[22] Filed: Aug. 29, 1980

[51] Int. Cl.³ .................... H04N 5/44; H04N 9/46
[52] U.S. Cl. .................................. 358/21 R; 358/20; 358/178; 358/172
[58] Field of Search ............... 358/19, 20, 160, 172, 358/178, 21 R

[56] References Cited

U.S. PATENT DOCUMENTS

| | | | |
|---|---|---|---|
| 3,268,656 | 8/1966 | Hansen | 358/20 |
| 4,213,151 | 7/1980 | Harford | 358/178 |
| 4,263,610 | 4/1981 | Shanley et al. | 358/20 |

Primary Examiner—Robert L. Richardson
Attorney, Agent, or Firm—Eugene M. Whitacre; Paul J. Rasmussen; Ronald H. Kurdyla

[57] ABSTRACT

A source of keying signals for use by keyed circuits in a television receiver comprises a keyed transistor, an input coupling circuit including a timing control circuit responsive to video sync signals for timing the operation of the keyed transistor to normally produce keying signals during blanking intervals of the television signal, and a switching network coupled to the input circuit. The switching network responds to switching signals for enabling the sync signals to be coupled to the keyed transistor via the input coupling circuit during the blanking intervals. During picture intervals of the television signal, the switching network disables the input coupling circuit to prevent the transistor from generating false keying signals in response to spurious input signals occurring during the picture intervals. In addition, the timing control circuit and transistor are isolated from the switching signal during picture intervals so that the switching signal does not upset the normally expected input timing bias of the transistor during picture intervals.

10 Claims, 8 Drawing Figures

KEYING SIGNAL GENERATOR WITH INPUT CONTROL FOR FALSE OUTPUT IMMUNITY

This invention concerns a circuit arrangement for developing a keying signal during the blanking intervals of a television signal, for use by keyed circuits in a television receiver. In particular, the invention concerns such a keying circuit wherein the circuit operation is inhibited during picture intervals of the television signal to prevent false output keying signals from being developed during the picture intervals.

In a color television receiver for processing a composite color television signal including luminance, chrominance and synchronizing signal components, there is a need for signal processing functions that require keying or synchronization with respect to the composite television signal. These functions include keying to separate the burst and chrominance information components of the composite signal, keying a blanking level clamp during image blanking intervals to establish a black reference level for a displayed picture, and keying during horizontal and vertical retrace blanking intervals to inhibit image display during these intervals.

When keyed luminance or chrominance signal processing circuits of the receiver are contained within an integrated circuit in whole or in significant part, it is desirable to provide a single, composite keying signal from which signals for performing the described keying functions can be derived. A single, composite keying signal of this type is desirable since only a single external keying signal input terminal of the integrated circuit is then required. Also, an integrated circuit incorporating a composite keying signal generator requires only one output terminal for providing the composite keying signal.

Such a composite keying signal is known, and is often referred to as a "sandcastle" signal because of its configuration. The sandcastle keying signal typically comprises a first pulse component of a given width, and a second pulse component of lesser width superimposed on the first pulse component. The first and second pulse components exhibit given amplitudes and timing in accordance with the keying and synchronizing requirements of signal processing circuits within the receiver.

It is desirable to prevent improper keying of the keyed receiver circuits. Such improper keying can occur if the keying signal generator is caused to produce an output keying signal during picture intervals of the video signal. This may occur, for example, in response to spurious signals such as noise and other effects occurring during the picture interval.

One keyed signal generator arranged to inhibit false picture interval keying signals by operating directly on the output of the keying signal generator is described in my copending U.S. patent application entitled "Keying Signal Generator With False Output Immunity," concurrently filed herewith. Another such keying signal generator arrangement is disclosed in a copending U.S. patent application Ser. No. 113,371 of R. L. Shanley, II, et al. titled "Controlled Output Composite Keying Signal Generator For A Television Receiver" and now U.S. Pat. No. 4,263,610.

Both of these arrangements include an active device normally keyed to operate during blanking intervals of the video signals for producing output keying signals, and an input timing control circuit which assists to time the operation of the active device so that properly timed output keying signals are produced. The active device is also undesirably subject to being keyed during picture intervals in response to spurious signals as noted above. Also in both of these arrangements, the output circuit of the active device is coupled to a control network for preventing spurious picture interval keying signals from being coupled to succeeding keyed signal processing circuits with a level sufficient to key these signal processing circuits.

It is herein recognized that with some keying signal generator arrangements, it may be inappropriate or impractical to inhibit spurious picture interval keying signals by directly controlling the output circuit of the keying signal generator. In addition, it is herein recognized that unwanted radio frequency interference (RFI) can be generated whenever the active device is keyed by a spurious input signal such as noise. Such RFI is associated with the rapid transitions of the active device between nonconductive and conductive states when keyed, and may disturb the operation of the receiver during image intervals.

Therefore, in accordance with the principles of the present invention, it is recognized as desirable to prevent the keying signal generator from producing spurious picture interval keying signals by controlling the input of the keying signal generator, particularly in a manner which does not disturb the normally expected operation of the input timing control circuit of the keying signal generator.

Keying apparatus according to the present invention is included in a television receiver for processing a composite television signal containing image information within periodic horizontal image intervals, and horizontal image sync information within periodic image blanking intervals. The receiver also includes a source of reference signals representative of the sync information, a source of switching signals comprising image and blanking interval components in synchronism with the image and blanking interval components of the television signal, and keyed video signal processing circuits.

The keying apparatus generates keying signals during the blanking intervals, and comprises an input signal coupling path, a keyed circuit, and a control network. The input path is coupled to the source of reference signals, and includes a timing circuit responsive to the reference signal for providing a timing signal corresponding to a translated version of the reference signal. The keyed circuit is normally subject to switching between first and second switching states in response to the timing signal for generating output keying signals during the blanking intervals. The keyed circuit is undesirably subject to switching between the first and second states in response to spurious input signals coupled via the input path during the image intervals. Output signals from the keyed circuit are coupled to the keyed signal processing circuits. The control network serves to inhibit false keying signal outputs from the keyed circuit during the image intervals. The control network is coupled to the input path and responds to the switching signals for enabling the input path during the blanking intervals, and for disabling the input path during the image intervals so that the timing circuit is isolated from the source of reference signals and from the source of switching signals during the image intervals.

Figure 1:
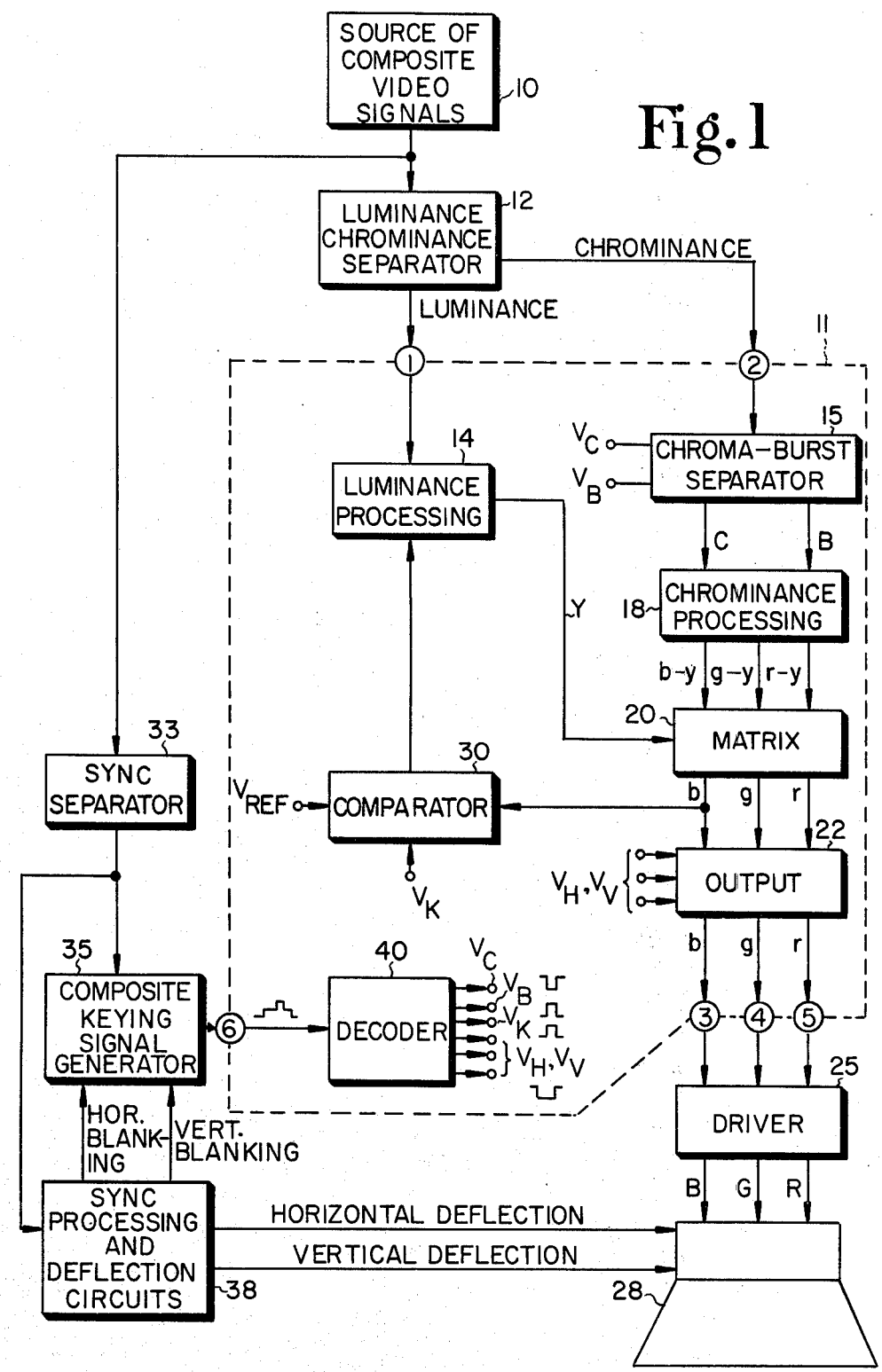
FIG. 1 shows a block diagram of a color television receiver comprising apparatus according to the present invention.

In FIG. 1, a source of composite color television signals 10, (e.g., including RF and IF amplifier and video detector stages of a color television receiver) supplies signals to a luminance-chrominance signal separator 12. Separator 12 (e.g., a comb filter) separates the luminance and chrominance components of the composite television signal, and supplies these separated components to respective input terminals 1 and 2 of a luminance and chrominance signal processing network 11.

The separated luminance component is processed by a luminance signal processing unit 14 in a luminance channel of the receiver. The separated chrominance component is supplied to a keyed chrominance-burst separator 15, which provides separated burst information (B) and chrominance picture interval information (C). Signal separator 15 can be of the type described in U.S. Pat. No. 4,038,681 of L. A. Harwood. The separated signals are then supplied to a chrominance signal processing unit 18 for developing r-y, g-y and b-y color difference signals as known. The color difference signals from unit 18 are combined with an amplified luminance output signal (Y) from unit 14 in a signal matrix 20, for developing output r, b and g color image signals.

The luminance channel also includes a blanking level clamp comprising a keyed comparator 30 which is keyed during the burst interval of each video signal horizontal blanking interval. When keyed, comparator 30 samples and compares a brightness reference voltage $V_{REF}$ with the D.C. level of the signal then appearing at the b (blue) signal output of matrix 20. An output signal from comparator 30 is supplied to a control input of luminance processor 14, for establishing the blanking level of the luminance signal (and thereby picture brightness) at a correct level in accordance with the level of voltage $V_{REF}$. The arrangement of comparator 30 with luminance processor 14 and matrix 20 is described in detail in U.S. Pat. No. 4,197,557 of A. V. Tuma, et al.

The r, g, b color signals from matrix 20 are separately coupled via plural output networks included in an output unit 22, to output terminals 3, 4 and 5 of network 11. The color signals are amplified individually by amplifiers within a kinescope driver stage 25 to provide high level output color signals R, G and B to respective intensity control electrodes of a color image reproducing kinescope 28.

Signals from source 10 are also supplied to a sync separator 33 for deriving the horizontal line synchronizing (sync) component of the television signal. The derived sync component is supplied from an output of sync separator 33 to sync processing and deflection circuits 38. Circuits 38 provide horizontal and vertical deflection signals for application to deflection control circuits of receiver kinescope 28, and timing signals including vertical and horizontal (flyback) blanking signals.

A composite keying signal generator 35 responds to output signals from sync separator 33, and to horizontal and vertical timing signals from deflection circuits 38. A composite ("sandcastle") keying signal output from generator 35 is supplied via a terminal 6 to a signal decoder 40, which decodes the composite keying signal into separate keying pulses $V_B$, $V_C$, $V_K$, and $V_H$, $V_V$ as required by keyed signal processing circuits within network 11. Decoder 40 is shown in detail in copending U.S. patent application Ser. No. 113,371 of R. L. Shanley, II, et al. noted previously.

Keying pulses $V_B$ and $V_C$ encompass the burst interval and exhibit a mutually antiphase (push-pull) relationship, and are supplied to keying inputs of chroma-burst separator 15. Keying pulse $V_K$ is in phase with and of the same (positive) polarity as pulse $V_B$, and is applied to a keying input of comparator 30. Plural keying pulses $V_H$, $V_V$ occur during each horizontal and vertical image retrace interval, and are applied to respective plural keying inputs of output stage 25.

In the arrangement of FIG. 1, the blocks within network 11 are largely capable of being fabricated as a single integrated circuit. In such case, terminals 1–6 correspond to external connecting terminals of the integrated circuit.

Figure 2:
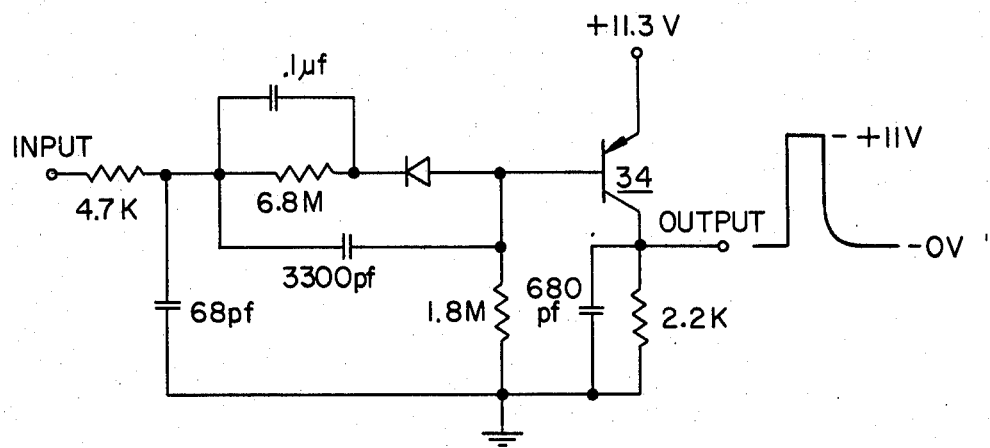
FIG. 2 shows a circuit diagram of a portion of the television receiver of FIG. 1.

FIG. 2 shows a circuit arrangement of sync separator 33 in FIG. 1. Input signals from source 10 (FIG. 1) are applied to the base circuit of a transistor 34. The output of sync separator 33 is provided from the collector circuit of transistor 34.

Figure 3:
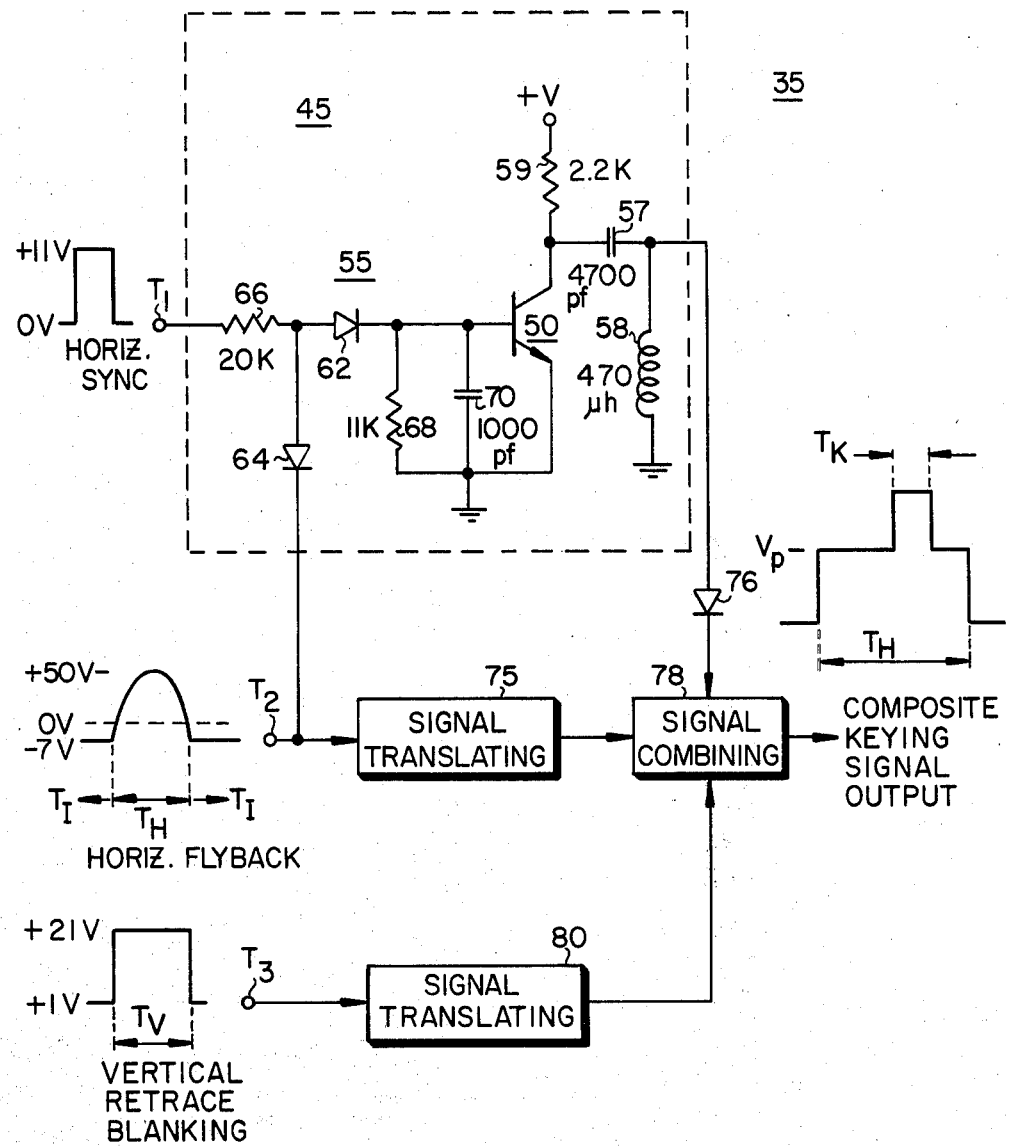
FIG. 3 illustrates a keying signal generator according to the invention, partly in circuit diagram form and partly in block diagram form.

FIG. 3 illustrates composite keying signal generator 35 of FIG. 1 in greater detail. In FIG. 3, positive horizontal sync pulses from the output of sync separator 33 are supplied to an input terminal $T_1$ of a pulse generator circuit 45. Circuit 45 comprises a normally nonconductive switching transistor 50, an input coupling and timing control network 55 coupled between terminal $T_1$ and the base input of transistor 50, and a resonant circuit comprising a capacitor 57 and an inductor 58 included in the collector output circuit of transistor 50 together with a load resistor 59. As disclosed in U.S. Pat. No. 4,051,518—Sendelweck, the resonant circuit is excited into ringing at its natural frequency when transistor 50 is keyed to conduct. The period of the ringing signal is determined by the values of capacitor 57 and inductor 58. A resulting output ringing signal in the collector circuit of transistor 50 coacts with the inverse conduction characteristic of transistor 50 to turn off transistor 50 prior to the completion of one full cycle of ringing, so that a positive pulse produced at the junction of capacitor 57 and inductor 58 corresponds to the first full half cycle (of positive polarity) of the ringing signal. The positive output pulse (approximately +8 volts peak amplitude) occurs over interval $T_K$ within horizontal retrace interval $T_U$, and encompasses the burst interval.

In this example, it is desired that the output pulse developed by circuit 45 be timed to occur over the burst interval, but after the horizontal sync interval. Proper timing of the output pulse relative to the burst interval can be accomplished by varying the values of capacitor 57 and inductor 58 to adjust the period of ringing of resonant circuit 57, 58. Also, the time at which transistor 50 conducts initially to excite resonant circuit 57, 58 into ringing, and hence the timing of the output pulse, can be tailored by adjusting the values of the resistance and capacitance elements that form input coupling circuit 55.

Input circuit 55 comprises switching diodes 62 and 64 as will be discussed subsequently, resistors 66 and 68, and a capacitor 70, arranged as shown. Resistors 66, 68 and capacitor 70 form a voltage divider and integrating network that serves to develop a ramp voltage waveform on capacitor 70 and at the base of transistor 50 in response to the input sync pulses. The values of resistors 66, 68 and capacitor 70 are chosen to determine an RC time constant such that, after a given length of time, the magnitude of the sync responsive ramp voltage reaches the threshold conduction level of transistor 50, causing transistor 50 to conduct. Thus resistors 66, 68 and capacitor 70 serve to delay by a predetermined amount the time at which transistor 50 conducts in response to the input sync pulse that occurs before the burst interval.

The timing of the output pulse from circuit 45 can be established by tailoring the values of the components included in both the input and the output circuits of transistor 50. However, with some other forms of pulse generator circuits, the input circuit provides the only mechanism by which the desired timing of the output pulse (i.e., relative to the input sync pulse interval) can be accomplished. An example of one such circuit is disclosed in the aforementioned copending U.S. patent application of R. L. Shanley, II, et al., Ser. No. 113,371.

Diodes 62 and 64 of circuit 45 serve to prevent circuit 45 from generating improperly timed, false output pulses in response to spurious input signals that may appear during image intervals ($T_I$) of the video signal. Such spurious signals can include thermal noise, and other forms of noise that may be associated with the video signal and appear at the output of sync separator 33 (FIG. 1).

Diodes 62 and 64 are arranged to operate as complementary switches in response to the locally generated horizontal timing signal that is applied to a terminal $T_2$ from the output of unit 38 in FIG. 1. The horizontal timing signal exhibits a negative voltage level during image intervals $T_I$, and includes a positive flyback pulse occurring during horizontal retrace blanking intervals $T_H$. Horizontal blanking interval $T_H$ encompasses both the horizontal sync interval, and the burst interval over which output pulses from circuit 45 appear.

During each horizontal blanking interval $T_H$, the positive flyback pulse portion of the horizontal timing signal reverse biases diode 64, rendering diode 64 nonconductive. Diode 62 is forward biased to conduct in response to the separated horizontal sync pulses coupled via terminal $T_1$. Transistor 50 is rendered conductive to develop a properly timed output pulse in response to a translated version of the input sync pulse as provided by input network 55, as discussed previously.

During each horizontal image interval $T_I$, the negative voltage level of the horizontal timing signal forward biases diode 64 to conduct, thereby clamping the junction of resistor 66 and diode 62 to a fixed clamping voltage of $-6.3$ volts. At the same time, diode 62 is rendered nonconductive by the clamping voltage. The clamping action of diode 64 and the nonconductive state of diode 62 during image intervals serves to assure that spurious signals such as noise, when appearing at terminal $T_1$ during image intervals, are isolated from transistor 50. Transistor 50 is thereby prevented from generating improperly timed false output pulses during image intervals. Nonconductive diode 62 also isolates the base bias voltage of transistor 50, as provided by the voltage on capacitor 70, from the negative voltage level associated with the horizontal timing signal. By this mechanism, variations in the voltage level of the timing signal during image intervals are prevented from varying the normally expected timing bias voltage developed on capacitor 70. Accordingly, the timing of the initial conduction of transistor 50 is predictably established. The timing signal is similarly isolated during the blanking intervals via diode 64, which is nonconductive during the blanking intervals. Thus the normally expected base bias voltage of transistor 50 is not disturbed by the horizontal timing signal.

Network 35 in FIG. 3 is arranged to provide a "sandcastle" composite output keying signal in the following manner.

The positive flyback pulse component occurring during blanking intervals $T_H$ of the horizontal timing signal is translated by a network 75 and afterwards is coupled to an input of a signal combining network 78. Output pulses generated by circuit 45 during burst interval $T_K$ are supplied to a second input of combiner 78. These output pulses are coupled from the junction of capacitor 57 and inductor 58 by means of a diode 76. Combiner 78 sums the output from circuit 45 with the translated horizontal flyback pulse to produce a composite output keying signal including first and second pulse components. During each horizontal retrace blanking interval $T_H$, the first (lower) pulse is produced in response to the translated horizontal flyback pulse and exhibits a pedestal blanking level $V_p$ (e.g., approximately $+2.5$ volts). The output pulse from circuit 45 comprises a second (upper) pulse component of the composite keying signal. The second pulse is superimposed on the first pulse component during interval $T_K$.

Analogous observations pertain with respect to generating a composite vertical blanking signal during vertical retrace blanking interval $T_V$. During each interval $T_V$, a positive vertical retrace blanking pulse is coupled via a terminal $T_3$ and translated by a network 80 to develop a voltage pulse corresponding to a desired pedestal level of the lower pulse component for vertical blanking purposes. Combiner 78 sums the translated pulse from network 80 with the output pulse from circuit 45 to develop a composite output signal for vertical purposes.

The waveforms of composite keying signals developed for horizontal and vertical purposes, as well as networks suitable for use as translating networks 75, 80 and combiner 78, are shown in greater detail in the aforementioned U.S. patent application of R. L. Shanley, II, et al.

Figure 4:
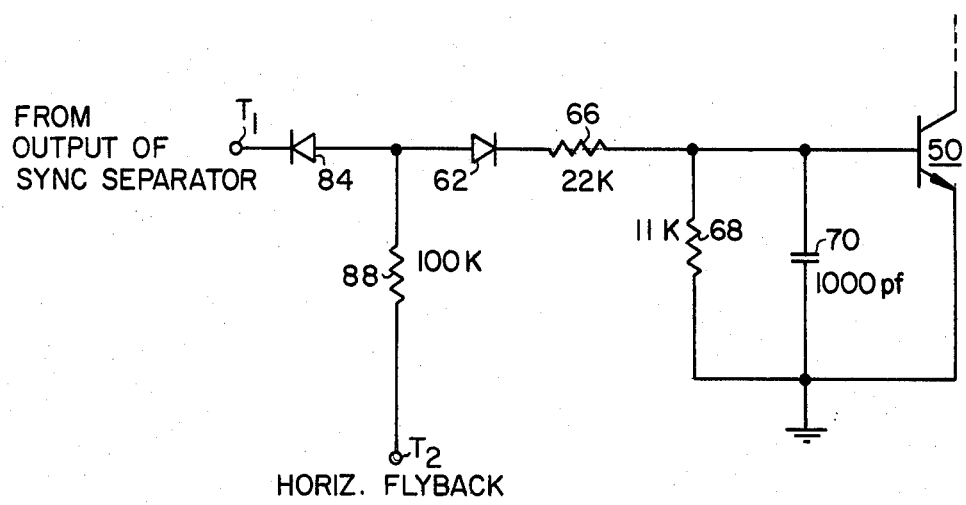
FIG. 4 shows a modified version of a portion of the arrangement of FIG. 3.

The circuit of FIG. 4 represents an alternative version of the input circuit of pulse generator circuit 45 in FIG. 3, wherein common elements are identified by the same reference number. Specifically, transistor 50, capacitor 70, and resistors 62, 66, 68 serve similar purposes in the arrangements of FIGS. 3 and 4.

Figure 5A:
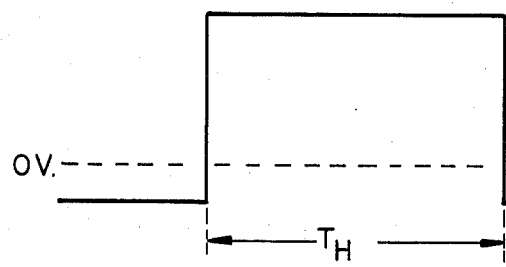
FIGS. 5a–5d illustrate signal waveforms helpful in understanding the operation of the arrangement shown in FIG. 4.
Figure 5B:
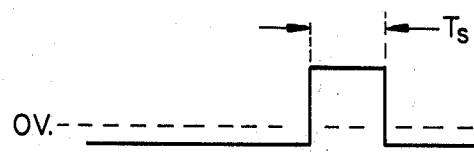
Figure 5C:
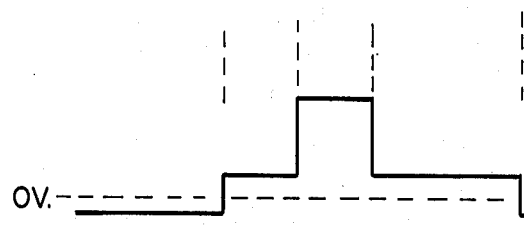
Figure 5D:
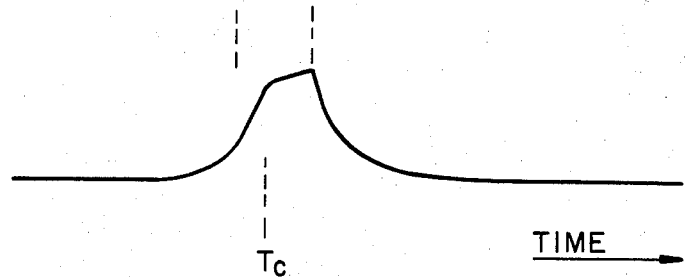

During each horizontal blanking interval $T_H$, the positive flyback pulse (represented by the waveform of FIG. 5a) as coupled via terminal $T_2$ and a resistor 88, forward biases diode 62 and a diode 84 arranged in series with diode 62 between terminal $T_1$ and transistor 50 as shown. A positive sync pulse (represented by the waveform of FIG. 5b) appears at input terminal $T_1$ during sync interval $T_S$ within blanking interval $T_H$ prior to the burst interval ($T_K$). A signal developed at the junction of conductive diodes 62 and 84 contains the sync pulse and is shown in FIG. 5c. A version of this signal is applied to the base of transistor 50 for keying transistor 50. The keying signal developed at the base of transistor 50 represents a translated version of the input sync pulse as developed by resistors 66, 68 and filter capacitor 70, and is represented by the waveforms of FIG. 5d. Transistor 50 conducts initially when the voltage developed on capacitor 70 reaches a level sufficient to forward bias the base-emitter junction of transistor 50. This occurs at a time $T_C$ after the beginning of sync interval $T_S$, as shown in FIG. 5d.

During each horizontal image interval $T_I$, the negative voltage level of the horizontal timing signal coupled via resistor 88 reverse biases both diodes 62 and 84, thereby isolating spurious signals such as may appear at terminal $T_1$ from transistor 50. Accordingly, spurious image interval signals are prevented from causing transistor 50 to conduct, whereby spurious output keying signals are prevented from being developed by transistor 50 during image intervals.

The normally expected base bias voltage of transistor 50 is substantially undisturbed by the horizontal timing signal during the image intervals due to the isolating effect of diode 62 during this time. Improved performance in this regard can be obtained if the sync separator circuit of FIG. 2 is modified so that the sync separator output circuit operates with reference to a source of negative D.C. potential, instead of zero volts (ground) as shown in FIG. 2. This modification will assure that the normally expected timing voltage provided by capacitor 70 as base bias for transistor 50 remains isolated from and undisturbed by the horizontal timing signal during the image intervals, by assuring that diode 62 remains nonconductive during this time even in the presence of variations in the relative timing between the horizontal sync pulse and the horizontal flyback pulse (the timing of which can vary with adjustments of the receiver horizontal hold control), and with variations in the shape and magnitude of the positive horizontal flyback pulse (which can vary in accordance with the magnitude of beam current conducted by the kinescope of the receiver).

What is claimed is:

1. In a television receiver for processing a composite television signal containing image information within periodic horizontal image intervals, and horizontal image sync information within periodic image blanking intervals, said receiver including a source of reference signals representative of said sync information; a source of switching signals comprising image and blanking interval components in synchronism with said image and blanking interval components of said television signal; and keyed video signal processing circuits; apparatus for generating keying signals during said blanking intervals, comprising:
   an input signal coupling path coupled to said source of reference signals and including timing means responsive to said reference signal for providing a timing signal corresponding to a translated version of said reference signal;
   keyed means normally subject to switching between first and second switching states in response to said timing signal for generating output keying signals during said blanking intervals, and undesirably subject to switching between said first and second states in response to spurious input signals coupled via said input path during said image intervals;
   means for coupling output signals from said keyed means to said keyed signal processing circuits; and
   control means for inhibiting false keying signal outputs from said keyed means during said image intervals, said control means being coupled to said input coupling path and responsive to said switching signals for enabling said input coupling path during said blanking intervals, and for disabling said input coupling path during said image intervals so that said timing means is isolated from said source of reference signals and from said source of switching signals during said image intervals.

2. Apparatus according to claim 1, wherein said control means comprises:
   a first unilateral current conducting device included in said input coupling path and poled for forward current conduction from said source of reference signals to said timing means;
   a second unilateral current conducting device coupled in shunt with said input coupling path prior to said first device and poled for forward current conduction from said input coupling path to said source of switching signals; and wherein
   said first device is enabled to conduct during said blanking intervals and said second device is disabled during said blanking intervals in response to said blanking interval component of said switching signal; and
   said first device is disabled during said image intervals and said second device is enabled to conduct during said image intervals in response to said image interval component of said switching signal.

3. Apparatus according to claim 1 or 2, wherein:
said timing means comprises means for producing a time translated version of said reference signal at an input of said keyed means.

4. Apparatus according to claim 3, wherein:
said timing means comprises a charge storage device.

5. Apparatus according to claim 4, wherein:
said timing means comprises a signal integrating network; and
said first and second devices comprise first and second diodes.

6. Apparatus according to claim 1, wherein said control means comprises:
   a first unilateral current conducting device coupled to said source of switching signals and included in said input coupling path, and poled for forward current conduction from said source of reference signals to said timing means;
   a second unilateral current conducting device coupled to said source of switching signals and included in said input coupling path prior to said first device, and poled for forward current conduction from said source of switching signals to said source of reference signals; and wherein
   said first and second devices are both enabled to conduct during said blanking intervals and disabled during said image intervals in response to said switching signals.

7. Apparatus according to claim 1 or 6, wherein:
said timing means comprises means for producing a time translated version of said reference signal at an input of said keyed means.

8. Apparatus according to claim 7, wherein:
said timing means comprises a charge storage device.

9. Apparatus according to claim 8, wherein:
said timing means comprises a signal integrating network; and said first and second devices comprise first and second diodes.

10. In a color television receiver for processing a composite color television signal containing image information within periodic horizontal image intervals, and image sync information within periodic image blanking intervals, said sync information including: a horizontal sync component, and a color burst component occurring during a burst interval; said receiver including a source of reference signals representative of said horizontal sync component; a source of switching signals comprising image and blanking interval components in synchronism with said image and blanking intervals of said television signal; and keyed signal processing circuits; apparatus for generating an output composite keying signal comprising a first pulse substantially coincident with said horizontal blanking intervals and a second pulse superimposed on said first pulse and encompassing said burst interval, said apparatus comprising:

means responsive to said switching signals for generating said first pulse during said horizontal blanking intervals;

an input signal coupling path coupled to said source of reference signals and including timing means responsive to said reference signal for providing a time translated version of said reference signal;

keyed means normally subject to switching between first and second switching states in response to said timing signal for generating an output pulse during said burst intervals and corresponding to said second pulse, and undesirably subject to switching between said first and second states in response to spurious input signals coupled via said input path during said image intervals;

means for combining said first and second pulses to produce said composite keying signal;

means for coupling said composite keying signal to said keyed signal processing circuits; and control means for inhibiting false pulse outputs from said keyed means during said image intervals, said control means being coupled to said input coupling path and responsive to said switching signals for enabling said input coupling path during said blanking intervals, and for disabling said input coupling path during said image intervals so that said timing means is isolated from said source of reference signals and from said source of switching signals during said image intervals.

* * * * *